(12) United States Patent
Kumar et al.

(10) Patent No.: US 7,483,846 B1
(45) Date of Patent: Jan. 27, 2009

(54) SERVICE FOR SELECTIVELY AND PROACTIVELY NOTIFYING USERS OF CHANGES IN STATES OF ITEMS IN AN ELECTRONIC CATALOG

(75) Inventors: Suresh Kumar, Issaquah, WA (US); Jacob A. Gabrielson, Seattle, WA (US); Jeffrey N. Peterson, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 734 days.

(21) Appl. No.: 10/889,972

(22) Filed: Jul. 13, 2004

(51) Int. Cl.
*G06Q 30/00* (2006.01)

(52) U.S. Cl. .............................. 705/26; 705/10; 705/14; 705/27; 705/37; 705/8

(58) Field of Classification Search ................ 705/8, 705/10, 14, 26–27, 37
See application file for complete search history.

(56) References Cited

U.S. PATENT DOCUMENTS

| | | |
|---|---|---|
| 6,466,970 B1 | 10/2002 | Lee et al. |
| 6,990,488 B1 | 1/2006 | Chenault |
| 2002/0046091 A1* | 4/2002 | Mooers et al. ................. 705/14 |
| 2002/0103789 A1 | 8/2002 | Turnbull et al. |
| 2002/0198882 A1 | 12/2002 | Linden et al. |
| 2003/0105682 A1* | 6/2003 | Dicker et al. .................. 705/27 |
| 2003/0149938 A1 | 8/2003 | McElfresh et al. |
| 2004/0204987 A1* | 10/2004 | Hill et al. ....................... 705/14 |
| 2005/0010494 A1 | 1/2005 | Mourad et al. |
| 2008/0140494 A1* | 6/2008 | Charuk et al. ................... 705/8 |
| 2008/0195461 A1* | 8/2008 | Li et al. ......................... 705/10 |

\* cited by examiner

*Primary Examiner*—Yogesh C Garg
(74) *Attorney, Agent, or Firm*—Knobbe, Martens, Olson & Bear LLP

(57) ABSTRACT

An electronic catalog system includes automated processes for detecting and handling specific types of browsing events, such as non-conversion events in which users browse but fail to purchase specific items. In one embodiment, when a user engages in a threshold level of browsing activity with respect to an item without making a purchase of that item or a substitute item, and a favorable change in the item's state thereafter occurs (e.g., the price is reduced or the item becomes available), the user is automatically notified of the state change. In another embodiment, when a user transitions away from an item or item category after engaging in a threshold level of browsing activity, a determination is made whether to present to the user a time-limited purchase incentive that is tied to that item or item category.

30 Claims, 7 Drawing Sheets

Special Offer

We noticed that you were interested in the Canon 3MP Digital Camera, but did not buy it. If you are willing to buy it right now, we will take an additional 5% off. Click here to buy in the next 60 seconds and save.

SERVICE FOR SELECTIVELY AND PROACTIVELY NOTIFYING USERS OF CHANGES IN STATES OF ITEMS IN AN ELECTRONIC CATALOG

BACKGROUND OF THE INVENTION

1. Field of the Invention

The present invention relates to data processing methods for automatically monitoring and analyzing the actions of users of a web-based or other electronic catalog, and for providing associated notifications and content to such users.

2. Description of the Related Art

Various types of computer-implemented services exist for assisting users in locating and purchasing items from an electronic catalog. For example, some retail sales web sites provide notification services through which users can subscribe to be notified by email when an out-of-stock item becomes available. In addition, some auction sites provide a service for notifying auction participants by email when they have been outbid. While these types of notification services are helpful, they generally benefit only those who have expressly requested to be notified about, or have bid on, the relevant item.

Some web sites also provide services for assisting users in identifying catalog items that are related to the items they have viewed or purchased. For example, it is known in the art to monitor and analyze the browsing actions of a population of users to identify catalog items that are related by virtue of the relatively high frequencies with which they are viewed, purchased, or otherwise selected in combination. The item relationships detected through such analyses may be displayed to assist users in identifying items of interest, and may also be used to provide personalized item recommendations to users.

SUMMARY OF THE INVENTION

One embodiment of the invention is a computer-implemented service that automatically detects non-conversion events in which a user browses, but does not purchase, an item in an electronic catalog. Each non-conversion event may be an event in which a user engages in a threshold level of browsing activity in connection with a particular item, such as by accessing the item's detail page multiple times or by selecting specific links on the item's detail page. Following the non-conversion event, if the state of the item changes such that the item becomes more attractive to the user as a purchase candidate, and the user has not since purchased the item, the user is automatically notified of the state change. The state change may, for example, be a reduction in the item's price, a change in the item's availability, or the addition of a review to the item's detail page. The notifications of the item state changes may be presented on personalized web pages, and may additionally or alternatively be communicated by email or other communications methods.

Additional embodiments and aspects of the invention are described below.

DETAILED DESCRIPTION OF SPECIFIC EMBODIMENTS

I. Introduction

Two specific embodiments of the invention will now be described with reference to the drawings. These embodiments are intended to illustrate, and not limit, the present invention. The scope of the invention is defined by the claims.

Figure 1:
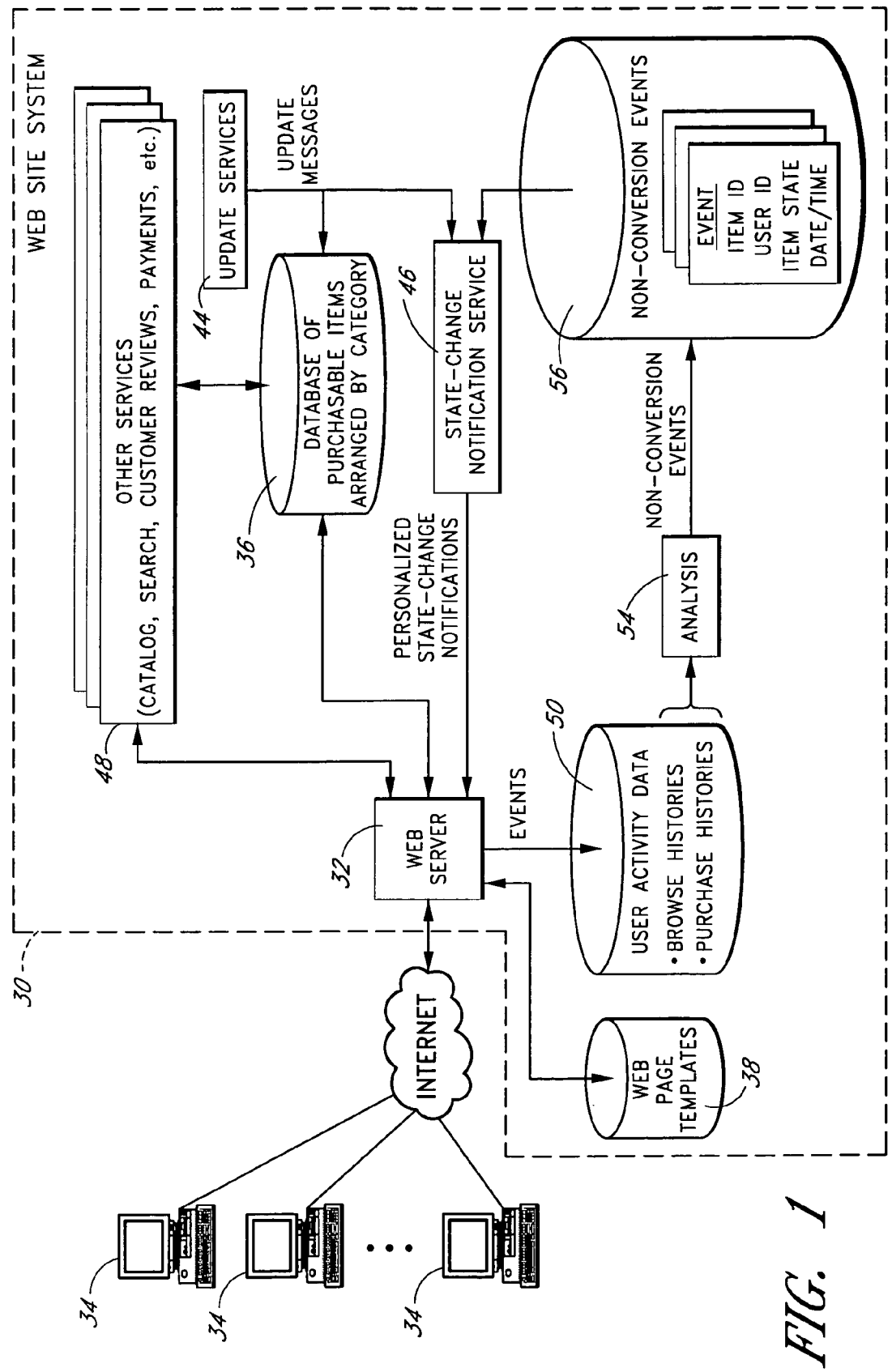
FIG. 1 illustrates the components of a web site system that implements a state-change notification service according to one embodiment of the invention.
Figure 2:
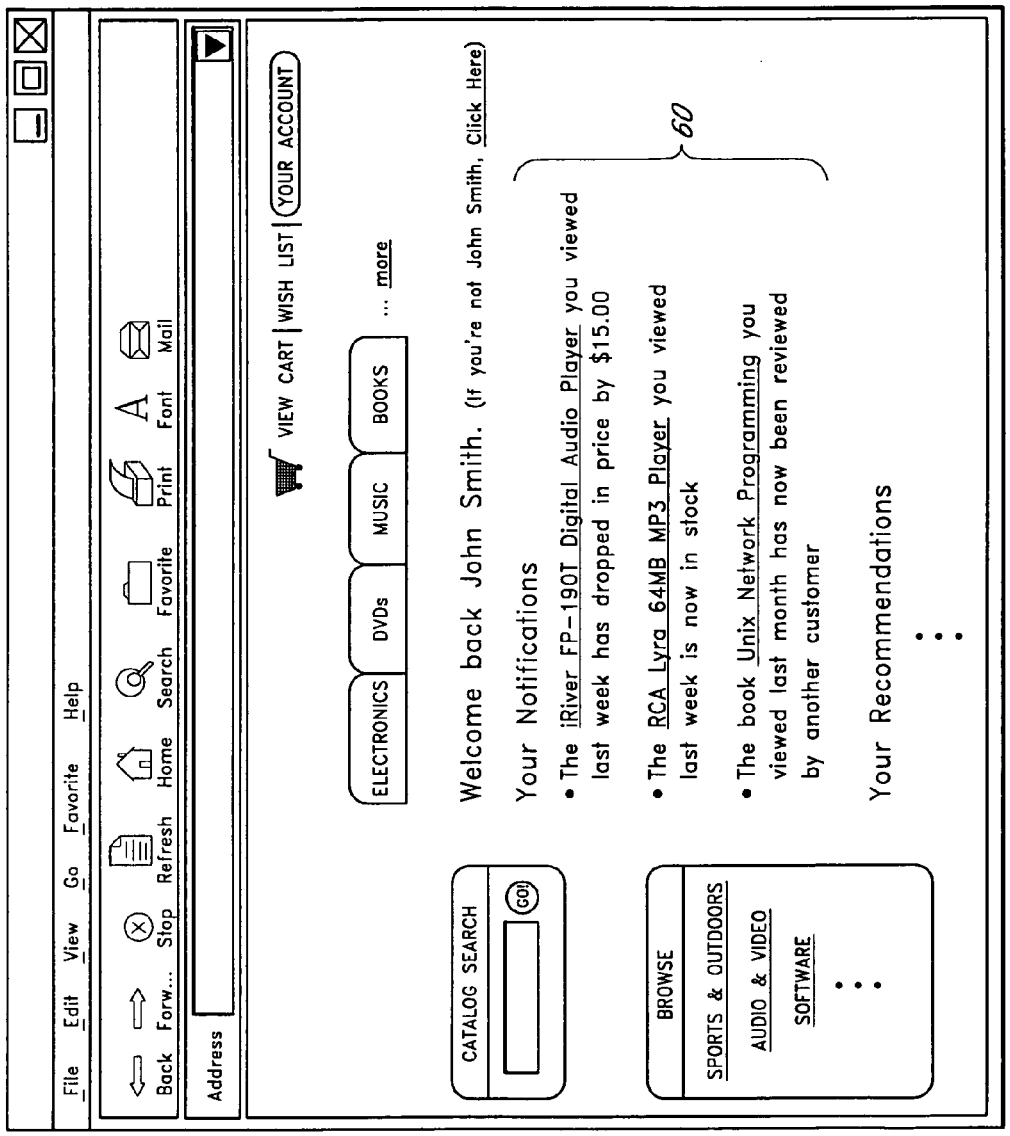
FIG. 2 illustrates one example of how state change notifications may be presented to users in the embodiment of FIG. 1.
Figure 3:
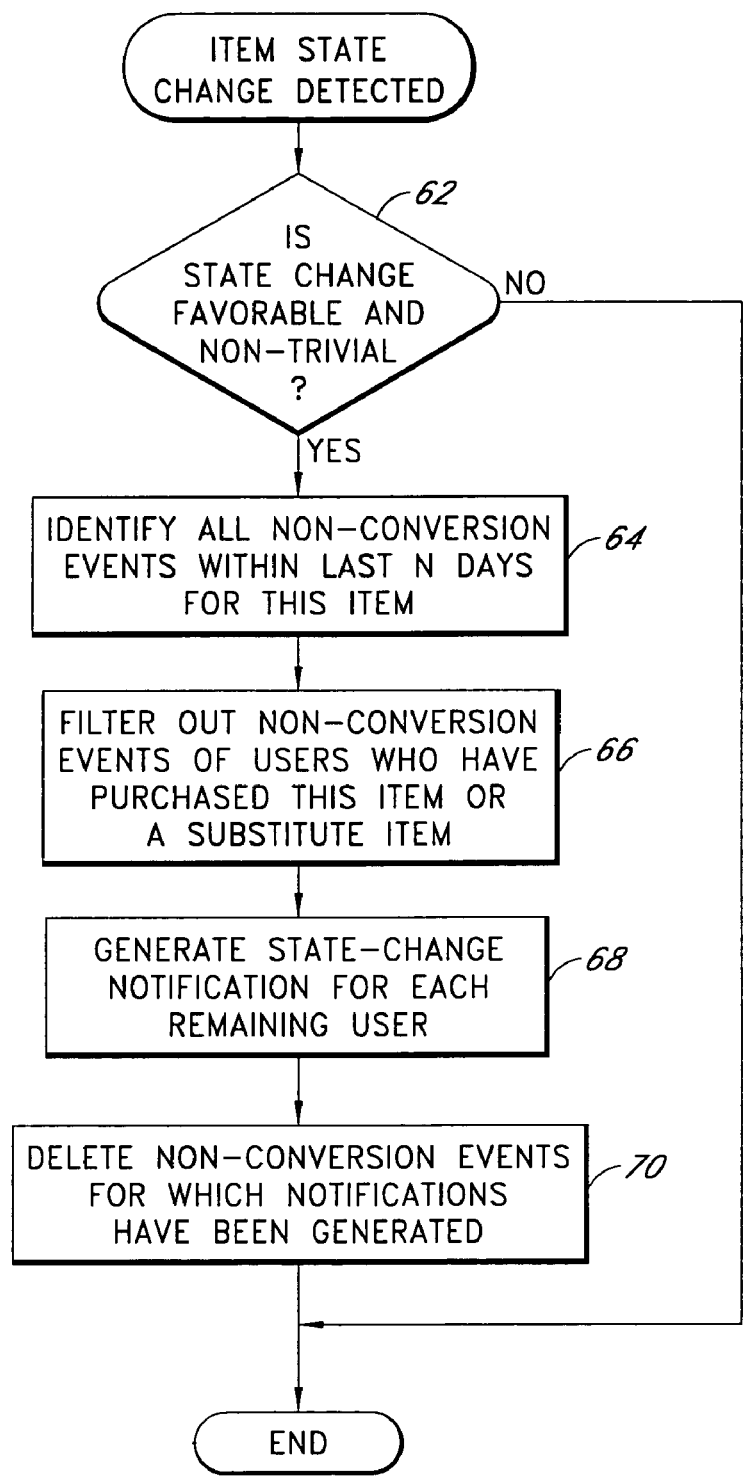
FIG. 3 illustrates one example of a process that may be used, in the embodiment of FIG. 1, to generate state-change notifications when the state of an item changes.

The first embodiment, which is depicted in FIGS. 1-3, is a computer-implemented service that analyzes user activity data reflective of catalog browsing actions to detect non-conversion events. Upon detecting a non-conversion event, information about the event is recorded, including an identifier of the user, an identifier of the associated item browsed by the user, and the time of the event. Information about the state of the browsed item as presented to the user is also recorded, such as the item's price and availability, the number of customer reviews displayed on the item's detail page, and/or any other variable item attribute data that may have influenced the user's decision not to purchase the item. If the item's state thereafter changes such that the item becomes more attractive to the non-converted user (e.g., the price is reduced or a customer review becomes available), the user is automatically notified of the state change. This first service is referred to herein as a "state-change notification service."

The second embodiment, which is shown in FIGS. 4-7, is a computer-implemented service that monitors user browsing activities in real time to detect "transition events" in which a user has engaged in a threshold level of browsing activity with respect to a particular item or item category, and is now transitioning away from that item or item category. For example, a transition event may be detected in which a user has viewed a number of MP3 players, and/or has selected a number of links associated with a particular MP3 player, and is now requesting a web page unrelated to MP3 players. Upon detecting the browsing transition, a programmatic decision is made whether to provide to the user a time-limited purchase incentive that is tied to the item or item category the user has discontinued browsing. This decision may be made so as to avoid the consistent or predictable presentation of the purchase incentives, so that users cannot easily "game" the system. This second service is referred to as a "selective transaction incentive service."

For purposes of illustration, these two services will be described separately. As will be apparent, however, the two services may be implemented in combination within a given system.

II. State-Change Notification Service (FIGS. 1-3)

FIG. 1 illustrates the components of a web site system 30 that implements a state-change notification service according to one embodiment of the invention. The system includes a web server 32 that services requests from user computer devices 34 (PCs, PDAs, web-enabled phones, etc.) over the Internet. As will be apparent, the invention may also be embodied in other types of multi-user, interactive systems, including on-line services networks and television-based browsing systems.

The web server 32 accesses a database 36 of information about items that are available for purchase via an electronic catalog that forms part of a web site. The web server 32 may retrieve item data from the database 36 directly, or alternatively, may retrieve such data from a service 48 or other component that accesses the database 36. The items represented within the database 48 may include physical products such as books, DVDs, and consumer electronics products, and/or may include downloadable items such as software products, music files and video files. Although depicted as a single database 36 for purposes of illustration, the item information may be distributed across multiple distinct databases. The system 30 may support retail sales of items, user-to-user or "marketplace" sales of items, or both.

Various types of attribute data may be stored in the database 36 for each item in the catalog, such as, for example, the item's price and availability, a graphic and textual description of the item, an editorial review of the item, one or more customer reviews of the item, and/or pending marketplace sales listings for the item. When a user browses a particular item in the electronic catalog, some or all of the currently stored attribute data for the item is presented to the user. The change in an attribute associated with a given item, such as the item's availability, is referred to generally as a change in the item's state.

Some or all of the items in the database 36 are arranged within a hierarchy of item categories. Each item is represented within the catalog by a corresponding item detail page that may be located, for example, by conducting a keyword search or navigating a categorical browse tree. In addition to displaying the various types of item attribute information mentioned above, an item's detail page may include links for purchasing the item (e.g., purchasing a physical unit of the item), viewing similar or related items, submitting a textual review/rating of the item, and performing other types of actions.

The system 30 also includes one or more update services 44 (collectively referred to as "the update service 44"), a state-change notification service 46, and various other services 48 such as a catalog service, a search service, a customer reviews service, and a payment service. Each service 44-48 may, for example, be implemented as a web service that may be accessed by other services of the system 30.

As further illustrated in FIG. 1, updates to the electronic catalog are made by the update service 44. The updates may include, for example changes to item prices and availability statuses, additions and deletions of item reviews and marketplace listings, and changes to other types of item attributes that may be displayed in the catalog. In addition, new items may be added to the catalog via the update service 44. When an update is made to the catalog in the illustrated embodiment, an update message is broadcast on a local network, allowing the other services of the system 30 to monitor various types of state changes. One such service is the state-change notification service 46, as described below.

The web server 32 responds to page requests generally by sending service requests to specific services 48, and by incorporating data returned by these services into web page templates 38 associated with such page requests. For example, when a user/browser requests an item detail page for a particular product, the web server 32 may retrieve an associated product description from a catalog service 48, and may retrieve customer reviews of the product from a customer reviews service 48. These and other types of service data may be incorporated into a detail page template to generate the requested product detail page.

As further depicted in FIG. 1, data descriptive of the browsing activities of each recognized user of the web site is collected over time in a repository 50 of user activity data. The user activity data may be stored in any of a variety of repository types, such as a server log file or "web log," a database of event data mined from a web log, a history server that stores event data in real time in association with corresponding users, or a combination thereof. One example of a history server architecture that may be used to store user activity data is disclosed in U.S. patent application Ser. No. 10/612,395, filed Jul. 2, 2003, the disclosure of which is hereby incorporated by reference. The data recorded for a given browsing event may, for example, include an identifier of the user, an identifier of the page viewed, a description of the dynamic content presented on the page, and a timestamp that indicates the date and time of the event. Some types of activity data, such as user purchase histories, may be stored separately from other types of activity data.

An analysis component 54 analyses the user activity data to detect non-conversion events in which users view, but fail to purchase, specific items. In one embodiment, a user's failure to purchase a viewed item is treated as a non-conversion event only if the user engaged in a threshold level of activity with respect to the particular item during the relevant browsing session, such as by doing one or more of the following: (a) accessing the item's detail pages multiple times during a selected time interval; (b) selecting one or more sub-links on the item's detail page, (c) viewing the detail page for more than a threshold period of time, such as two minutes, or (d) removing the item from a shopping cart. In one embodiment, mere item viewing events, without more, are not treated as non-conversion events.

The analysis component 54 may analyze sets of user activity data in an off-line or batch processing mode. For example, in one embodiment, the analysis component 54 is executed once per day, at which time it analyses the user activity data collected over the preceding twenty-four hours. As will be apparent, the task of analyzing user browsing actions may alternatively be performed in-whole or in-part in real time.

As depicted in FIG. 1, each detected non-conversion event is recorded in a non-conversion events database 56. The data recorded for each non-conversion event includes an identifier of the user, an identifier of the item, state information descriptive of the item's state at the time of the non-conversion event, and an event timestamp. The item state data may, for example, include any one or more of the following: the item's price, the item's availability, the item's sales rank, an indication of whether any customer and editorial reviews existed for the item, the average customer rating of the item, an indication of whether the item was available for local pick-up, and information about any marketplace listings for the item. Any of a variety of other item state information that may have influenced the user's decision not to purchase the item may also be recorded. Rather than recording the item state information in association with specific non-conversion events, a time-stamped history of the state of each item may be maintained, such that state of an item at the time of a non-conversion event may later be determined.

Table 1 illustrates, in pseudocode, one example of the general process that may be used by the analysis component 54 to detect and record non-conversion events. In this example, a set of user activity data collected over a particular time interval, such as one day, is analyzed on a session-by-session basis to detect non-conversion events. In addition, the item state information is recorded in association with specific non-conversion events.

TABLE 1

Example algorithm for detecting non-conversion events

For each browsing session represented within set of activity data;
  For each item viewed during the browsing session;
    If user performed threshold level of activity without making a
    purchase, create non-conversion event record with user ID, item
    ID, item state, and timestamp.

The state-change notification service 46 uses the event data stored in the non-conversion events database 56 to generate personalized notifications to users. Specifically, upon detecting a favorable change in the state of an item (i.e., a change that generally makes the item more attractive or desirable as a purchase candidate), the service 46 identifies users that recently considered but did not purchase the item, and generates notification messages to notify such users of the state change.

In some embodiments, the service 46 may also notify users of state changes that are not necessarily favorable. For example, if the inventory level of the previously-viewed item falls below some threshold level, such as three units, the user may be notified of the number of units left. Further, in addition to notifying the user of changes to the state of the previously-viewed item itself, the service 46 may notify the user of state changes to closely related items, such as items that are replacements or substitutes for the previously viewed item. For example, if a user views the detail page of a consumer electronics item while the item is out of stock, and a new model that replaces that item thereafter becomes available, the user may be notified of the availability of the new model.

As depicted in FIG. 2, the notifications may be displayed on a personalized web page, which may be the home page of the web site. In this example, three notification messages 60 are displayed, each of which corresponds to a particular product that was recently viewed but not purchased by the user. The notifications also indicate the state changes that have occurred, and provide links to the associated product detail pages. In one embodiment, when the user follows such a link to access a product's detail page, the user is presented with a special version of the detail page that highlights the changes made to the page since the prior viewing event. For example, if an editorial review has been added since the non-conversion event, the detail page may display the editorial review in highlighted text.

Web pages of the type shown in FIG. 2 may be generated using a web page template 38 that causes the web server 32 to query the state-change notification service 46 for any new notifications 60 for the associated user. Although the notifications 60 are displayed within customized web pages in this example, the notifications may additionally or alternatively be communicated to users by other methods. For example, in one embodiment, if the user does not access the web site within a selected time interval (e.g., 5 days) after a state change occurs, the associated notification 60 is sent to the user by email. The state change notifications may additionally or alternatively be presented on the detail pages of the items to which such notifications pertain; for instance, if a user requests the detail page of an item whose state has changed since the user last viewed that item, the detail page may be personalized with a notification of the state change.

In addition to the types of state changes depicted in FIG. 2, users may be notified of some or all of the following types of attribute changes: (a) improvement's in an item's sales rank, (b) increases in the average customer rating of an item, (c) the availability of new accessories for the item, (d) the creation of a marketplace listing for a used unit of the item, (e) the release of an upgraded version or model of the item, (f) the availability of the item for local pickup at a physical store.

FIG. 3 illustrates one example of an algorithm that may be used by the state-change notification service 46 to generate notifications. This process may be invoked whenever an update message is received indicating that the state of an item in the catalog has changed. As indicated by block 62, if the state change is not both favorable and non-trivial, no notifications are generated. Examples of state changes that are not favorable are price increases, out-of-stock events, and negative and neutral reviews. Examples of trivial state changes are small price drops (e.g., less than 5%), and the addition of a customer review for a product that already has two or more customer reviews.

In block 64, all non-conversion events generated for this item within the last N days (e.g., 30 days) are identified in the non-conversion event database 56. In block 66, non-conversion events of users who have since purchased this item or a substitute item are filtered out. Two items may be treated as substitutes if, for example, (a) they are members of the same bottom-level item category of the browse tree, or (b) users who view the detail page of one item commonly view the detail page of the other item during the same browsing session, as determined by analyzing browsing session records of users. One example of an automated process that may be used to detect items that are likely substitutes is disclosed in U.S. Patent Pub. No. US 2002/0019763 A1, published Feb. 14, 2002 (see FIG. 3B and associated description).

In block 68, personalized state-change notification messages 60 are generated for each of the remaining users. As shown in FIG. 2, each such message 60 may be personalized by including an indication of when the user previously viewed the associated item, and/or by indicating the amount by which the relevant item attribute has changed since such viewing (note that this amount may be different for different users). The notification messages 60 generated for a given user over a period of time may be aggregated in storage until the user returns to the web site or the messages expire. In block 70, the non-conversion events for which notifications have been generated are deleted from the database 56.

As illustrated by the foregoing, an important benefit of this embodiment is that users are notified of favorable state changes automatically, without having to subscribe to be notified in connection with specific items. In addition, the notification messages 60 in this embodiment are presented unobtrusively, and only for those items for which the user has engaged in a threshold level of affinity-evidencing activity without completing a corresponding purchase.

As will be apparent to those skilled in the art, the various functional components shown in FIG. 1, and the process shown in FIG. 3, may be implemented within software executed by one or more general purpose computers.

II. Selective Transaction Incentive Service (FIGS. 4-7)

Figure 4:
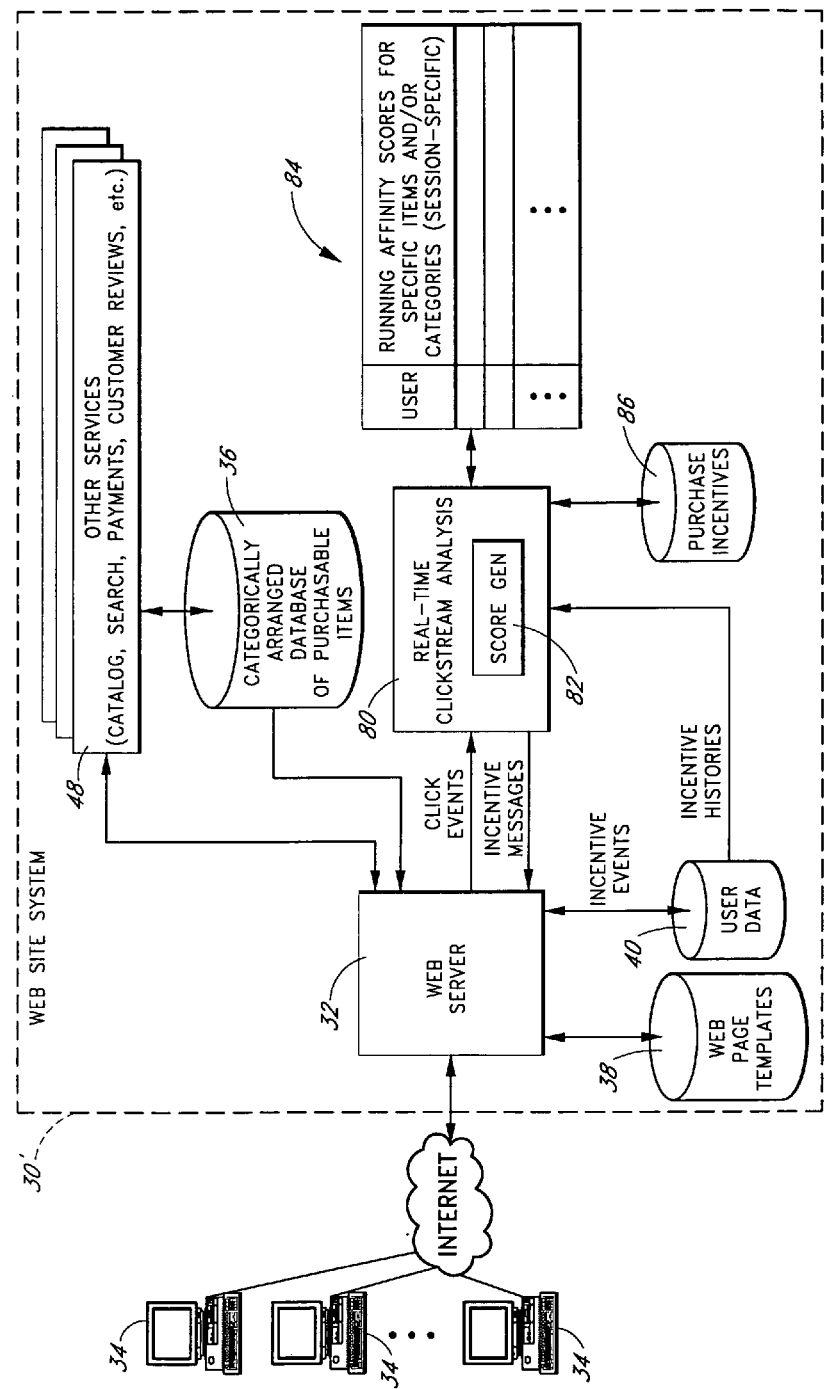
FIG. 4 illustrates the components of a web site system that implements a selective transaction incentive service according to one embodiment of the invention.

FIG. 4 illustrates a web site system 30' that implements a selective transaction incentive service according to one embodiment of the invention. The system 30' includes a web server 32, a database of purchasable items 36, a repository of web page templates 38, and a set of services 48, all of which may be similar or identical to like components shown in FIG. 1 and described above. In addition, the system 30' includes a real-time clickstream analysis component 80 that monitors user selection or "click" events in real time as users browse the electronic catalog.

In the illustrated embodiment, the real-time clickstream analysis component 80 includes a score generation component 82 that generates a set of affinity scores for each ongoing browsing session. Each affinity score corresponds to a particular item or item category accessed by a corresponding user during a current browsing session, and represents a degree to which the user has shown an affinity for that item or item category during the session. The scores may also reflect actions performed during prior browsing sessions. The system 30' may generate affinity scores for items only, for item categories only, or both. The affinity scores may be maintained in a table 84 or other data structure in a computer memory. A given score may be represented within memory as, for example, a single value or a set of two or more values. The invention may alternatively be practiced without generating scores.

As described below, the affinity scores are used to detect transitions in which a user is deemed to have discontinued browsing of an item or item category for which user has demonstrated a threshold level of interest. (The affinity scores may also be used to detect non-conversion events for purposes of implementing the state-change notification service described above.) Upon detecting such a transition, the system 30' programmatically decides whether to present to the user a time-limited purchase incentive offer that corresponds to the particular item or item category the user has been browsing. As discussed below, this decision may be made so as to avoid predictability from the perspective of users.

Figure 5:
FIG. 5 illustrates one example of how a purchase incentive offer may be presented to a user in the embodiment of FIG. 4.

As depicted in FIG. 5, the purchase incentive offer may be displayed to the user in a pop-up browser window, and may correspond to an item or item category the user has discontinued browsing. In this example, the purchase incentive is a discount offer for a particular product the user has viewed. Other types of purchase incentives, such as free shipping, may also be provided. The purchase incentive need not be tied specifically to an item the user has viewed; for example, the purchase incentive may be tied to a pre-selected item falling within the item category browsed by the user, or may apply to the category as a whole. As depicted in FIG. 4, a purchase incentives database 86 may specify the purchase incentive offers that are do be displayed for various items and/or item categories.

The purchase incentive offer may be presented when, or shortly after, the user transitions away from the relevant item category. For example, if a user views several MP3 players within the "portable audio" category and then begins browsing books, an incentive offer may be presented with the first or second web page the user accesses within the books category. The incentive offer may alternatively (or additionally) be presented during a subsequent browsing session, such as the next time the user returns to the web site. Although a pop-up window is used in the illustrated example, the offer may alternatively be embedded within a web page requested by the user. The incentive offer may be valid for a limited period of time, such as the next sixty seconds or until the current browsing session ends.

Figure 6:
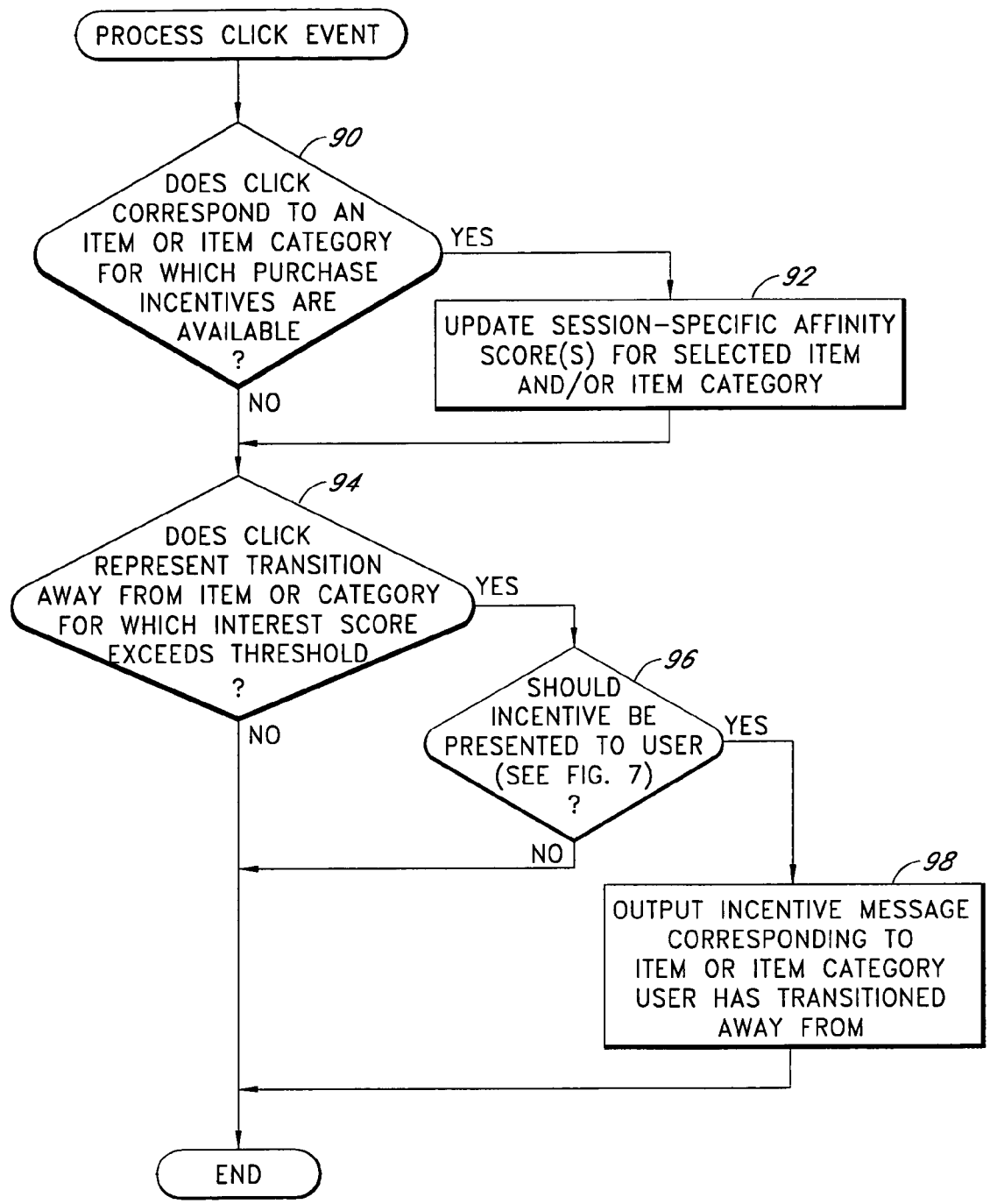
FIG. 6 illustrates one example of a process that may be used in the embodiment of FIG. 4 to detect and respond to browsing transition events.

FIG. 6 illustrates one example of an algorithm that may be implemented by the real-time clickstream analysis component 80 to process click events substantially in real time. As depicted in block 90, the algorithm initially determines whether the click event corresponds to an item or item category for which purchase incentives are available. If it does, one or more session-specific affinity scores are updated to reflect the click event.

In one embodiment, a separate affinity score is generated for each item selected by the user for viewing during the current session. Each time the user performs a subsequent action that corresponds to this item, the associated score is incremented. The amount by which the affinity score is incremented may depend upon the type of action performed. For instance, the affinity score may be incremented by "1" each time the user accesses the item's detail page; by "2" each time the user selects a sub-link on that detail page, and by "5" if the user removes the item from a shopping cart. The affinity score generally represents a prediction of the user's level of interest in this particular item.

Rather than maintaining item-specific affinity scores, the real-time clickstream analysis component 80 may generate affinity scores for item categories only. This may be accomplished, for example, by responding to each item selection event by incrementing the category affinity score associated with each bottom-level item category in which the selected item falls. If item-specific scores are maintained, the affinity score for a given item category may be generated by summing the item scores of all items falling within that category.

In block 94, the algorithm determines whether the click event represents a transition away from an item or item category for which a corresponding affinity score exceeds a selected threshold, such as five. This step 94 may be performed so as to detect transitions away for items only, transitions away from item categories only, or both. In one embodiment, a transition to a new category is ignored in step 94, regardless of affinity score values, if the new category overlaps with (i.e., contains at least one item in common with) the immediately preceding item category browsed by the user. For example, if the user transitions from the category "cell phones" to the category "camera & photo," and both of these categories include a particular camera cell phone, the transition may be disregarded on the basis that the user may still be browsing the same type of item.

If the determination in step 94 is positive, a decision is made whether to present a corresponding incentive offer to the user (block 96). One example of an algorithm that may be used to make this decision is illustrated in FIG. 7, which is discussed below.

If a decision is made to present the incentive offer to the user, an incentive message is presented to the user (block 98), and the incentive event is recorded in association with the user's account. Rather than displaying the offer message immediately, the message may be presented only if and when the user fails to return to the relevant item or item category during subsequent browsing. For example, the incentive offer may be presented only if the user selects M consecutive links that are unrelated to the previously-browsed item category, where M is a selected value such as 2, 3, 4 or 5.

If the click does not represent a transition event in block 94, or a determination is made in block 96 not to offer a purchase incentive to the user, the process ends without outputting an incentive message to the user.

Figure 7:
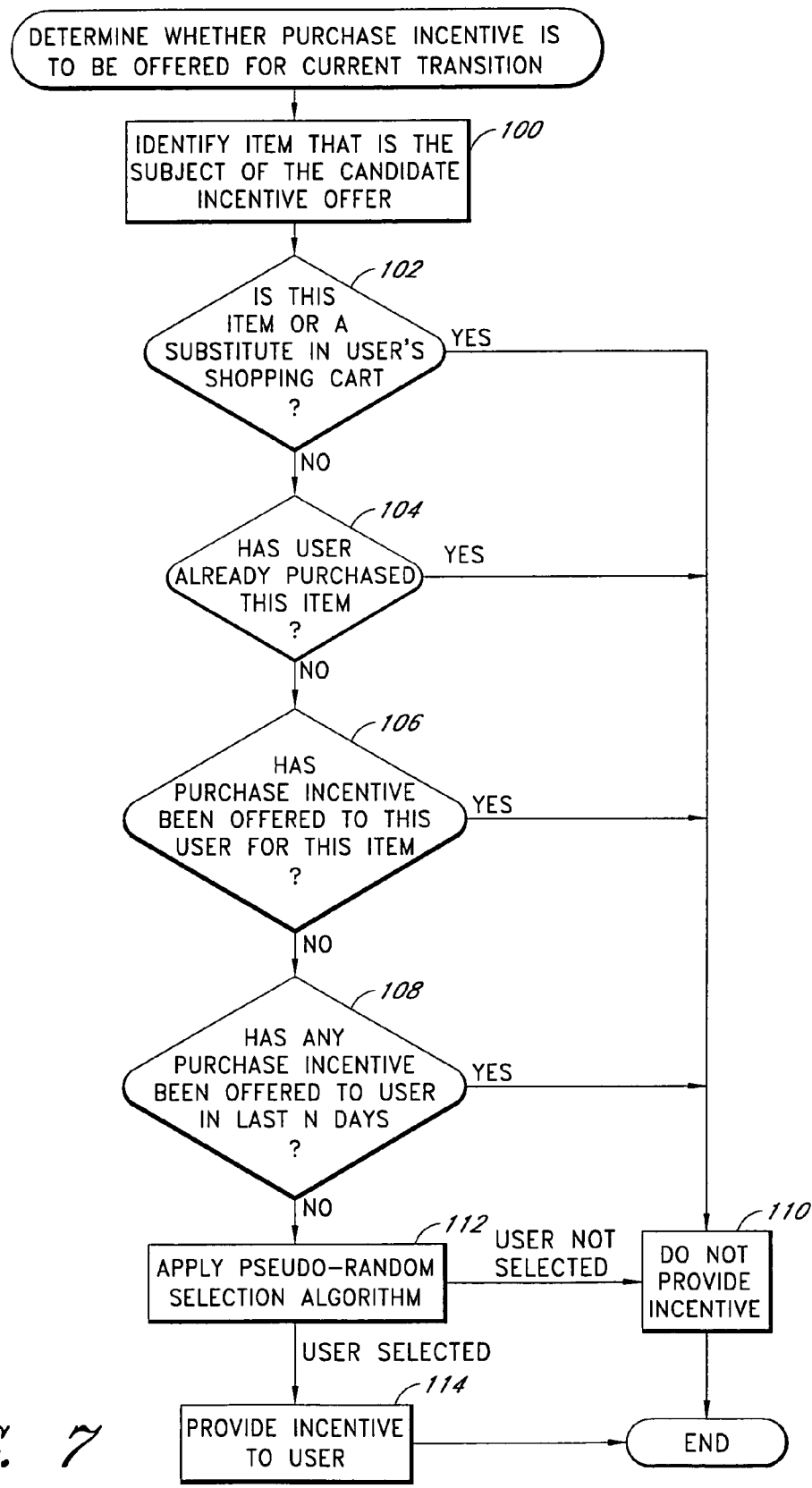
FIG. 7 illustrates one example of a process that may be used in the embodiment of FIG. 4 to determine whether a purchase incentive offer should be presented in response to a browsing transition event.

FIG. 7 illustrates one example of an algorithm that may be used by the real-time clickstream analysis component 80 to programmatically decide whether to offer a purchase incentive in response to the detected transition event. In this example, it is assumed that the candidate purchase incentive applies to a particular item, which may or may not be an item actually viewed during the session. For purchase incentives that apply to a set of items (e.g., all MP3 players), steps 100-106 may be omitted.

As depicted in block 100, the item that is the subject of the candidate purchase incentive is initially identified. This may be accomplished by, for example, accessing the purchase incentives database 86 (FIG. 4) to identify a purchase incentive that corresponds to the item or item category from which the user is transitioning away. As depicted in blocks 102-110, the purchase incentive is not offered to the user in this example if any of the following conditions exist: (a) the identified item, or a substitute for that item, is currently in the user's shopping cart, (b) the identified item has previously been purchased by the user, (c) the user has already been offered a purchase incentive for this particular item, or (d) the user has been offered a purchase incentive in the last N days (e.g., three days). A repository of event history data may be maintained and used to make these determinations.

If none of the foregoing conditions exist, a pseudo-random selection algorithm is applied to determine whether to offer the purchase incentive, as depicted in block 112. To inhibit the frequent display of purchase incentives, this algorithm may provide a low selection probability, such as 2% to 15%. A pseudo-random algorithm has the benefit of reducing predictability from the perspective of users, and thus inhibits users from "gaming" the system to obtain discounts on items they plan to purchase. As an alternative to a pseudo-random algorithm, any algorithm that provides for the relatively infrequent or unpredictable display of purchase incentives may be used.

As a further impediment to gaming, once a decision has been made not to present a particular incentive offer to the user, the decision may remain in effect for the remainder of the current browsing session, the current day, or another appropriate time period. With this approach, the user generally will not be able to increase the likelihood of a particular offer being displayed by repetitively transitioning away from a particular item or item category.

As depicted by block 114, if the user is selected by the pseudo-random algorithm, the associated incentive message is presented to the user during the current browsing session— either immediately or after an appropriate delay.

As will be apparent from the foregoing, an important aspect of this embodiment is that users are provided with targeted incentives to purchase items that they have considered but have likely decided not to buy. Thus, sales resulting from this feature are likely to be sales that would not otherwise have occurred.

As with the state-change notification service, the selective transaction incentive service may be implemented in software executed by one or more general purpose computers. The functions performed by each service may be fully automated, requiring no human intervention on the part of system operators. As mentioned above, both services may be implemented in combination within a given electronic catalog system to assist an online merchant servicing its customers.

Although this invention has been described in terms of certain embodiments and applications, other embodiments and applications that are apparent to those of ordinary skill in the art, including embodiments which do not provide all of the features and advantages set forth herein, are also within the scope of this invention. Accordingly, the scope of the present invention is defined only by the appended claims. The inventors reserve the right to pursue additional claims that extend beyond the scope of the following claims.

For purposes of defining the invention, the term "purchase" is not limited to transactions in which the user obtains an ownership interest in the item or items being purchased. Rather, the term also encompasses transactions in which the user pays or agrees to pay money to rent, obtain a license to, or subscribe to, a particular item.

What is claimed is:

1. A computer-implemented method of monitoring changes to states of items in an electronic catalog, the method comprising:

generating user activity data reflective of actions performed by a user with respect to an item in an electronic catalog of items;

programmatically analyzing the user activity data to determine that the user's actions represent a non-conversion event;

storing information about the non-conversion event, including an identifier of the user, an identifier of the item, and state data descriptive of a state of the item at a time of the non-conversion event; and subsequent to the non-conversion event, and in response to a change in the state of the item, using the stored information about the non-conversion event, including said identifier of the user, said identifier of the item, and said state data descriptive of the state of the item at the time of the non-conversion event, to generate a state-change notification message to notify the user of the change in state, wherein using the stored information to generate the state change notification message comprises (a) determining whether to generate a state change notification message to notify the user of the change in state, and (b) when said determination is positive, generating the state change notification message for transmission to the user;

wherein the above recited steps of the method are performed via execution of software by one or more processors, and the state change notification message is provided without requiring the user to subscribe to be notified in connection with said item.

2. The method of claim 1, wherein the state data comprises a price of the item as presented to the user, and the change in the state of the item is a reduction in said price.

3. The method of claim 1, wherein the state data comprises an indication that the item was not available at the time of the non-conversion event, and the state change is a change in an availability status of the item.

4. The method of claim 1, wherein the state data comprises an indication that no customer reviews of the item were available to display to the user, and the state change comprises the addition to the electronic catalog of a customer review of the item.

5. The method of claim 1, wherein the information about the non-conversion event is stored, at least in part, in response to a determination that the user selected one or more sub-links on an item detail page of the item.

6. The method of claim 1, wherein the information about the non-conversion event is stored, at least in part, in response to a determination that the user accessed an item detail page of the item multiple times.

7. The method of claim 1, wherein the information about the non-conversion event is stored, at least in part, in response to a determination that the user did not purchase a substitute for the item.

8. The method of claim 1, wherein programmatically analyzing the user activity data comprises taking into consideration an amount of time spent by the user viewing the item.

9. The method of claim 1, further comprising incorporating the state change notification message into a web page requested by the user.

10. The method of claim 9, wherein the web page is a home page of a web site that hosts the electronic catalog.

11. The method of claim 9, wherein the web page is an item detail page for the item.

12. The method of claim 1, wherein the state data is stored in a database in association with the non-conversion event.

13. The method of claim 1, wherein the state data is stored as part of a time-stamped history of the state of the item, such that the item's state at the time of the non-conversion event can later be determined based on a time of occurrence of the non-conversion event.

14. An electronic catalog system that performs the method of claim 1.

15. The method of claim 1, wherein the method comprises using the stored information about the non-conversion event to determine an amount by which an attribute of the item has changed since the non-conversion event, and including an indication of said amount in the state change notification message.

16. The method of claim 1, wherein the method comprises personalizing the state-change notification message for the user based on the stored information about the non-conversion event.

17. The method of claim 1, wherein the method comprises using the stored information about the non-conversion event to personalize the state-change notification message with at least an indication of when the user previously viewed the item.

18. The method of claim 1, wherein the state-change notification message is specific to said item.

19. A computer system, comprising:
a monitoring component that monitors browsing actions of users of an electronic catalog of items to generate user activity data;
an analysis component that analyses the user activity data to identify non-conversion events in which a user accesses an item in the catalog but does not complete a transaction associated with the item;
a database that stores information about the non-conversion events detected by the analysis component, including identifiers of associated users and items; and
a notification component that is responsive to a change in the state of a catalog item by using the stored information about non-conversion events to identify a user that failed to complete a transaction associated with the item, and by outputting a notification message to notify the user of the state change when said state change is positive, said notification component operative to provide said notification message without requiring the user to subscribe to be notified in connection with the item;
wherein the monitoring component, analysis component, and notification component comprise computer hardware that executes software.

20. The system of claim 19, wherein the analysis component takes into consideration a user's level of browsing activity with respect to an item in determining whether to treat an item browsing event as a non-conversion event.

21. The system of claim 19, wherein the notification component notifies the user of the state change in further response to a determination that the user has not purchased the item or a substitute item since the non-conversion event.

22. The system of claim 19, wherein the change in the state of the catalog item is the addition of a review of the item to the electronic catalog.

23. The system of claim 19, wherein the state change is a reduction in a price of the catalog item.

24. The system of claim 19, wherein the database stores, in association with a non-conversion event, item state data descriptive of a state of an item at a time of the non-conversion event.

25. The system of claim 19, wherein the notification component incorporates notifications of item state changes into web pages requested by the associated users.

26. The system of claim 19, wherein the database additionally stores state data descriptive of states of the items at times of the non-conversion events, and the notification component uses said state data to generate personalized state change notification messages.

27. The system of claim 19, wherein the notification component uses the stored information about a non-conversion event to determine an amount by which an attribute of the item has changed since the non-conversion event, and includes an indication of said amount in the notification message.

28. The system of claim 19, wherein the notification component personalizes the notification message for the user based on stored information about an associated non-conversion event.

29. The system of claim 19, wherein the notification component uses the stored information about a non-conversion event to personalize the notification message with at least an indication of when the user previously viewed the item.

30. The system of claim 19, wherein the notification message is specific to said catalog item.

* * * * *